(12) United States Patent  
Garg

(10) Patent No.: US 8,290,231 B2
(45) Date of Patent: Oct. 16, 2012

(54) METHOD AND APPARATUS FOR PROVIDING MEASUREMENT DATA OF AN ANOMALY IN A MEDICAL IMAGE

(76) Inventor: Naveen Garg, Worcester, MA (US)

( * ) Notice: Subject to any disclaimer, the term of this patent is extended or adjusted under 35 U.S.C. 154(b) by 827 days.

(21) Appl. No.: 12/359,002

(22) Filed: Jan. 23, 2009

(65) Prior Publication Data

US 2010/0189325 A1    Jul. 29, 2010

(51) Int. Cl.
*G06K 9/00* (2006.01)
*G06K 9/48* (2006.01)
(52) U.S. Cl. .................. 382/131; 382/132; 382/199
(58) Field of Classification Search .......... 382/131, 382/132, 149, 199
See application file for complete search history.

(56) References Cited

U.S. PATENT DOCUMENTS

| | | | | |
|---|---|---|---|---|
| 6,289,107 | B1 * | 9/2001 | Borchers et al. | 382/100 |
| 6,478,462 | B2 * | 11/2002 | Polkus et al. | 378/207 |
| 6,819,779 | B1 * | 11/2004 | Nichani | 382/104 |
| 7,003,161 | B2 * | 2/2006 | Tessadro | 382/199 |
| 7,050,620 | B2 * | 5/2006 | Heckman | 382/133 |
| 7,343,032 | B2 * | 3/2008 | Oakley et al. | 382/128 |
| 7,697,786 | B2 * | 4/2010 | Camus et al. | 382/286 |
| 8,041,103 | B2 * | 10/2011 | Kulkarni et al. | 382/144 |
| 2003/0219147 | A1 * | 11/2003 | Nishiura | 382/103 |
| 2004/0091151 | A1 * | 5/2004 | Jin et al. | 382/199 |
| 2006/0013454 | A1 * | 1/2006 | Flewelling et al. | 382/128 |
| 2006/0245653 | A1 * | 11/2006 | Camus et al. | 382/199 |
| 2007/0047787 | A1 * | 3/2007 | Oakley et al. | 382/128 |
| 2008/0009758 | A1 * | 1/2008 | Voth | 600/523 |
| 2010/0061601 | A1 * | 3/2010 | Abramoff et al. | 382/117 |
| 2010/0067753 | A1 * | 3/2010 | Visser | 382/128 |
| 2010/0142766 | A1 * | 6/2010 | Fleming | 382/117 |
| 2010/0189325 | A1 * | 7/2010 | Garg | 382/131 |
| 2011/0110567 | A1 * | 5/2011 | Jiang | 382/128 |

* cited by examiner

*Primary Examiner* — John Lee
(74) *Attorney, Agent, or Firm* — Hamilton, Brook, Smith & Reynolds, P.C.

(57) ABSTRACT

Many image processing problems are concerned with determining measurements of an anomalous area in an image. Most automated systems suffer from low specificity, which may reduce their acceptance. An example embodiment of the present invention relates to a method and corresponding apparatus for providing measurement data of a region of interest in an image in a graphical user interface environment. The example embodiment locates a pair of edges in multiple dimensions of a region of interest selected by a user, calculates a center position between respective edges, and iterates until a convergence or divergence is determined. Linear calculation may be employed for rapid results, allowing an advance in speed of image processing over current techniques. In a case of convergence, the measurement data is reported. In a case of divergence, a failure state is reported. By reporting divergence, the example embodiment achieves high specificity, thereby reducing the number of false positive reports.

21 Claims, 11 Drawing Sheets

METHOD AND APPARATUS FOR PROVIDING MEASUREMENT DATA OF AN ANOMALY IN A MEDICAL IMAGE

BACKGROUND OF THE INVENTION

A large number of image processing problems are concerned with determining the structure of an anomalous area in a larger field of regard. In the context of medical imaging, there is great interest in characterizing already identified regions of interest. Image processing methods, such as computer aided diagnosis (CAD), may also be used to aid diagnosis and confirm or facilitate interpretation and findings by an image screener, such as a radiologist.

Most available CAD methods are designed to have high sensitivity. However, while having high sensitivity, most CAD systems suffer from low specificity. Thus, while these systems may highlight anomalous regions correctly (i.e., correct diagnosis or true positive), they may also incorrectly highlight healthy sections (i.e., incorrect diagnosis or false positive). Unfortunately, having low specificity may reduce the acceptance of CAD methods by the medical community since a medical professional (e.g., radiologist) may need to review the findings of a CAD module to identify false positives.

SUMMARY OF THE INVENTION

A method or corresponding apparatus in an example embodiment of the present invention provides measurement data of a region of interest of an image in a graphical user interface (GUI) environment by locating a pair of edge points in a first dimension and a pair of edge points in a second dimension of the region of interest. The region of interest is selected by the user in a pixel field presented in the GUI. The example embodiment calculates a center position between respective edge points in the first and second dimensions and continues to locate updated edge points and calculate updated center positions until a convergence or divergence is determined. In the event that convergence is determined, the example embodiment computes measurement data based on a final center position relative to edge points associated with the final center position. The example embodiment reports the measurement data in the event that convergence is detected or reports a failure state in the event that divergence is detected.

It should be understood that the region of interest may be selected by a user or may be selected by a computer in an automated or semi-automated manner, such as through user-configured criteria. If selected by a computer, the computer may select the region of interest in a predetermined or arbitrary manner. Convergence or divergence is determined thereafter as though the user selected the region of interest.

The example embodiment may compensate for noise during the locating of the pairs of edge points. In order to compensate for noise, the example embodiment may employ at least one of the following: averaging multiple pixels at each pixel position along each dimension during the locating of the edge points or smoothing multiple pixels at each pixel position along each dimension during the locating of the edge points.

The example embodiment may locate the pairs of edge points as a function of identifying a pixel value deviation corrected for noise. In order to locate the pairs of edge points, the example embodiment may transition outward from the center position along a single pixel line in the first and second dimensions until the respective pairs of edge points are identified. The example embodiment may locate the pairs of edge points using a gray-scale of the raw image and not a gray-scale of pixel values of the displayed pixel field. The example embodiment may locate the pairs of edge points as a function of employing information stored in a Digital Imaging and Communications in Medicine (DICOM) image.

The example embodiment may compute the measurement data based on at least one of the following: computing a size of the region of interest, computing a density of the region of interest optionally by computing the density of the region of interest as a function of using a gray-scale of the GUI, computing a texture of the region of interest, computing a position of the region of interest within the pixel field, computing a distance of the region of interest (e.g., located center position) from the initial center position, or computing a distance of the region of interest from a second region of interest (e.g., center position-to-center position).

The pixel field presented in the GUI may be a radiological image, computed tomography image, or X-ray image and the region of interest selected by the user may be an anomaly detected in a radiological image.

The example embodiment may locate the pairs of edge points in response to a selection of a point in the region of interest by the user, repeat the locating and calculating for a selectable number of times, repeat the locating and calculating in the first or second dimensions but not both, or allow divergence after repeating the locating and calculating for a predetermind number of times. The first and second dimensions may be orthogonal dimensions, and the region of interest may be non-homogenous.

The example embodiment may calibrate the measurement data based on a resolution of the screen. The example embodiment may report the measurement data using methods available in the art such as: superimposing the measurement data on the pixel field, transmitting the measurement data via a data network, or storing the measurement data to a storage unit and optionally storing the measurement data in an electronic format.

Another example embodiment of the present invention relates to a method and corresponding apparatus for training an image screener. The example embodiment presents the image screener with an image in a GUI that includes a pixel field having multiple potential regions of interest. The example embodiment determines whether convergence or divergence occurs in an attempt to locate a center of a region of interest selected by the user in an automated manner. The example embodiment reports to the user whether the selected region of interest resulted in a convergence or divergence to enable the user to make future selections of regions of interest that will result in an automated convergence. The image screener may be a radiologist, and the image may be a radiological image, including a computed tomography image.

Another example embodiment of the present invention relates to a computer-readable medium having computer-readable code stored thereon, which, when executed by a processor, causes the processor to present an image in a GUI including a pixel field having multiple potential regions of interest. The example embodiment determines whether convergence or divergence occurs in an attempt to locate a center of a region of interest selected by the user in an automated manner and reports to the user whether the selected region of interest resulted in a convergence or divergence. This feedback trains the user to make future selections of regions of interest that will result in an automated convergence.

Yet another example embodiment of the present invention relates to a method and corresponding apparatus for detecting edge points surrounding a point in an image. The example embodiment determines the edge points as a function of linear walks around a starting point in a plurality of dimensions in the image. The example embodiment computes a center of a region bounded by the edge points, updates the starting point to be a center for the region bounded by the edge points, and repeats the finding, computing, and updating until a convergence or divergence of the center point is determined The example embodiment computes features of the region bounded by the edge points and reports the computed features in the event convergence is detected or reports an ill-defined border or failure state in an event divergence is detected.

The example embodiment may locate the pairs of edge points as a function of displayed pixel data on a graphical user interface (gray scale value or color) or raw image data in computer memory. The region bounded by the edge points may be a subset of a larger image. The example embodiment may incrementally increase the size of the region bounded by the edge points to include the larger image. The starting point may be in a region of interest initially detected by a user or computer program such as a radiologist or computer-assisted diagnosis program for the case of a medical image.

The example embodiment may filter and compensate for noise during the linear walk. The example embodiment may perform a single linear walk for a 2-dimensional image. The number of pixels filtered or processed may be lower in number than a total number of pixels in the image.

The features of the region of interest include diameter, area, density, extrema, texture, centroid, and convex hull. The example embodiment may calculate the features of the region of interest along fewer dimensions than number of dimensions in the image.

The image may be a medical image including a Digital Imaging and Communications in Medicine (DICOM), any photographic image, a video frame, or any numerical data that may be displayed as an image.

The example embodiment may report the measurement data by displaying the data as image markup, transmitting the measurement data via a data network, or storing the measurement data locally in electronics or on paper.

The example embodiment may display the edge points or features, if found, on a screen and periodically update the edge points or features as a function of mouse motion or changing image.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1A:
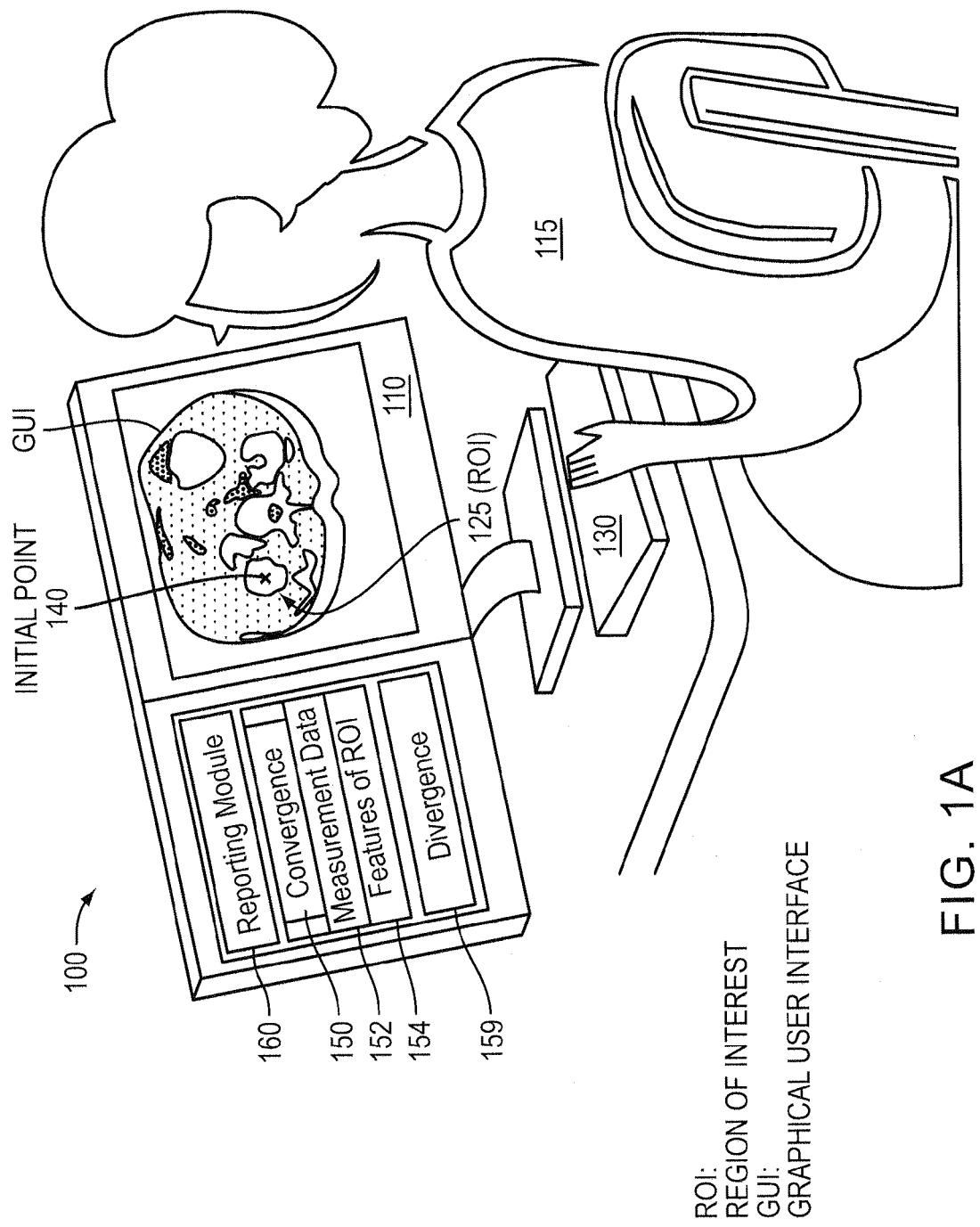
FIG. 1A illustrates an example embodiment of the present invention for providing measurement data of a region of interest of an image in a graphical user interface (GUI).

FIG. 1A illustrates an example embodiment 100 of the present invention for providing measurement data of a region of an interest of a pixel field (e.g., an image) in a graphical user interface (GUI). The pixel field includes images such as radiological images, computed tomography images, or X-ray images. In this example embodiment, a screener 115 (e.g., radiologist or physician) monitors images (e.g., radiological images) and detects a region (or regions) of interest 125 in these images. The region of interest may be an anomaly (or anomalies), such as tumors, aneurisms, etc., found in radiological images. In one example embodiment, the screener may monitor radiological images such as Computed Tomography (CT) images. Other images, such as X-ray tomography, Magnetic Resonance Imaging, Digital Imaging and Communications in Medicine (DICOM) images, may also be employed. The images may be presented to the screener 115 on a display screen, such as a computer monitor 110. The images may be presented to the screener in a GUI. In this example embodiment, the screener 115 employs a peripheral device (e.g., a computer mouse or a computer keyboard 130) to select an initial point 140 positioned within the region of interest 125, as understood in the art.

Various other methods may be used to select the initial point 140 within the region of interest 125. For example, the screener 115 may press a key on a computer keyboard 130 or receive the initial point 140 from other modules or applications. In another example, an automated application that detects a region of interest 125 and automatically selects an initial point 140 within the region of interest 125 may be employed.

The example embodiment employs the selected initial point 140 to determine features of the region of interest 125, such as size, density, texture, diameter, area, centroid, convex hull, and so forth. In order to look for the features of the region of interest 125, the example embodiment employs an iterative method that starts at the selected initial point 140 and searches for boundaries of the region of interest 125. The region of interest 125 may be homogenous or non-homogenous. After performing the search, the example embodiment may reach a state of convergence or divergence. In the event a state of convergence 150 is reached, the example embodiment reports measurement data 152 and determined features 154 of the region of interest 125. In the event a state of divergence is reached 160, the example embodiment reports divergence and may prompt the screener 115 to select an alternative initial point within the region of interest 125. The reporting of convergence 150 or divergence 159 may be done using a reporting module 160.

As used herein, convergence 150 is obtained when the determined features 154 of the region of interest 125 remain within a certain limit. In order to determine convergence, the example embodiment may determine the differences between the measurement data or determined features obtained from any given iteration to the measurement data or determined features obtained from that iteration's previous or subsequent iteration. If the determined differences between the measurement data from consecutive iterations is within a predetermined range or less than a predetermined threshold, the example embodiment may continue to iterate or declare convergence. If the change between the measurement data from consecutive iterations is outside of the predetermined limit over a set number of iterations, the example embodiment declares divergence.

Figure 1B:
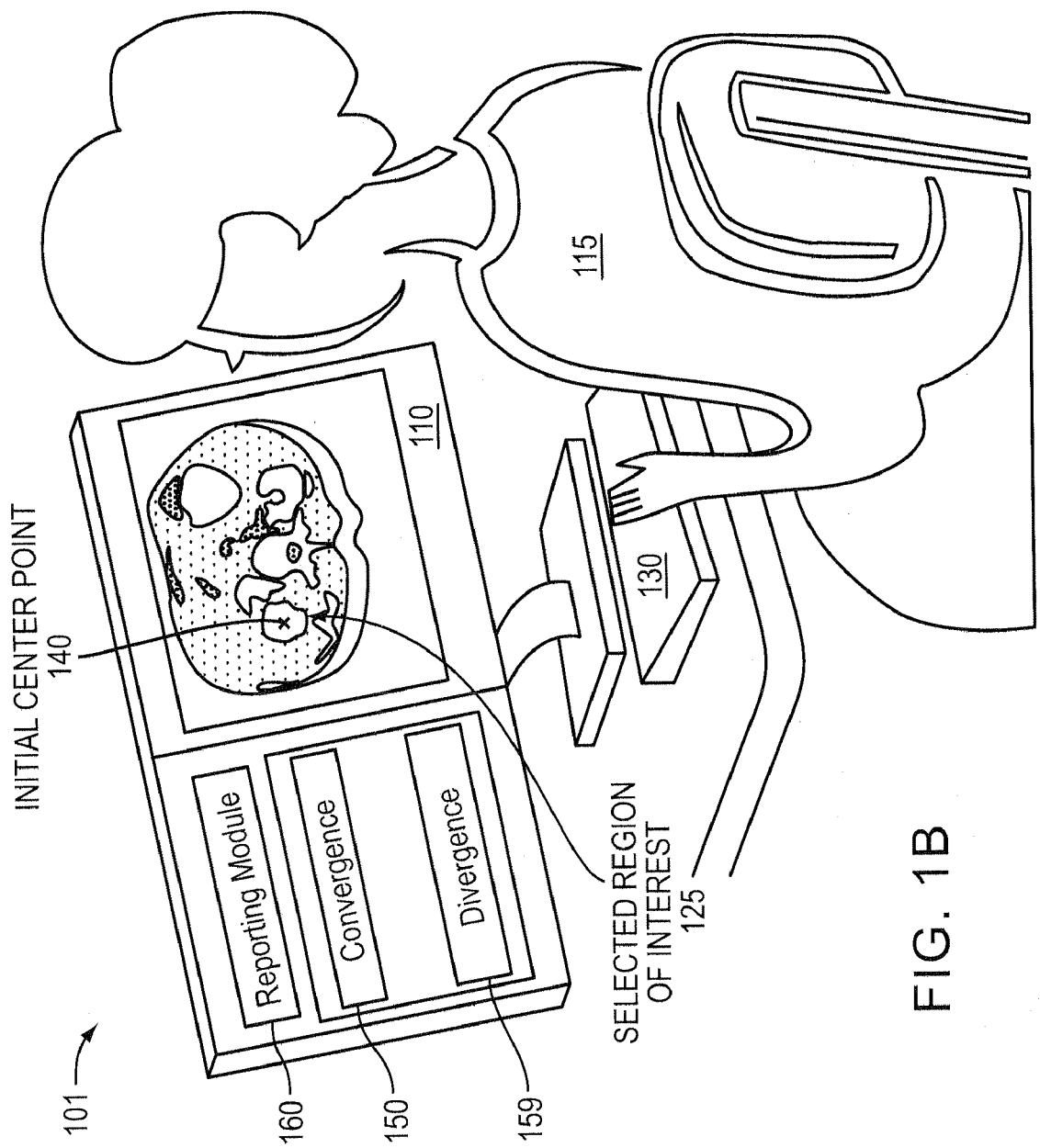
FIG. 1B illustrates an example embodiment of the present invention for training an image screener in making future selections of regions of interest of an image to obtain automated convergence.

FIG. 1B illustrates an example embodiment 101 of the present invention for training an image screener 115 in making future selections of regions of interest 125 in an image to obtain automated convergence.

The image may include radiological images, computed tomography images, or X-ray images. In this example embodiment 101, a screener 115 (e.g., radiologist or physician) monitors images (e.g., radiological images) and detects region (or regions) of interest 125 in these images. The region of interest may be an anomaly (or anomalies), such as tumors, aneurisms, etc., found in radiological images. The images may be presented to the screener 115 on a display screen, such as a computer monitor 110. The images may be presented to the screener in a GUI. In this example embodiment 101, the screener 115 employs a peripheral device (e.g., a computer mouse or a computer keyboard 130) to select an initial point 140 positioned within the region of interest 125, as understood in the art.

The user 115, after being presented with the image, selects an initial center point 140 within the region of interest 125. The example embodiment 101 employs the selected point to search for a center position of the region on interest 125. The example embodiment 101 determines if convergence 150 or divergence 159 is obtained. The example embodiment 101 reports to the user 115 if convergence 150 or divergence 159 is obtained to train the user to make future selections of the region of interest 125. For example, if the user 115 selects an initial center point 140 close to the center of the region of interest 125 and convergence is obtained, the user is trained to make his/her future selections at or near the center of the region of interest 125. Whereas, if the user 115 selects an initial center point 140 near the boundary of the region of interest 125 and divergence is obtained, the user is trained to make his/her future selections away from the boundaries of the region of interest 125.

Figure 2:
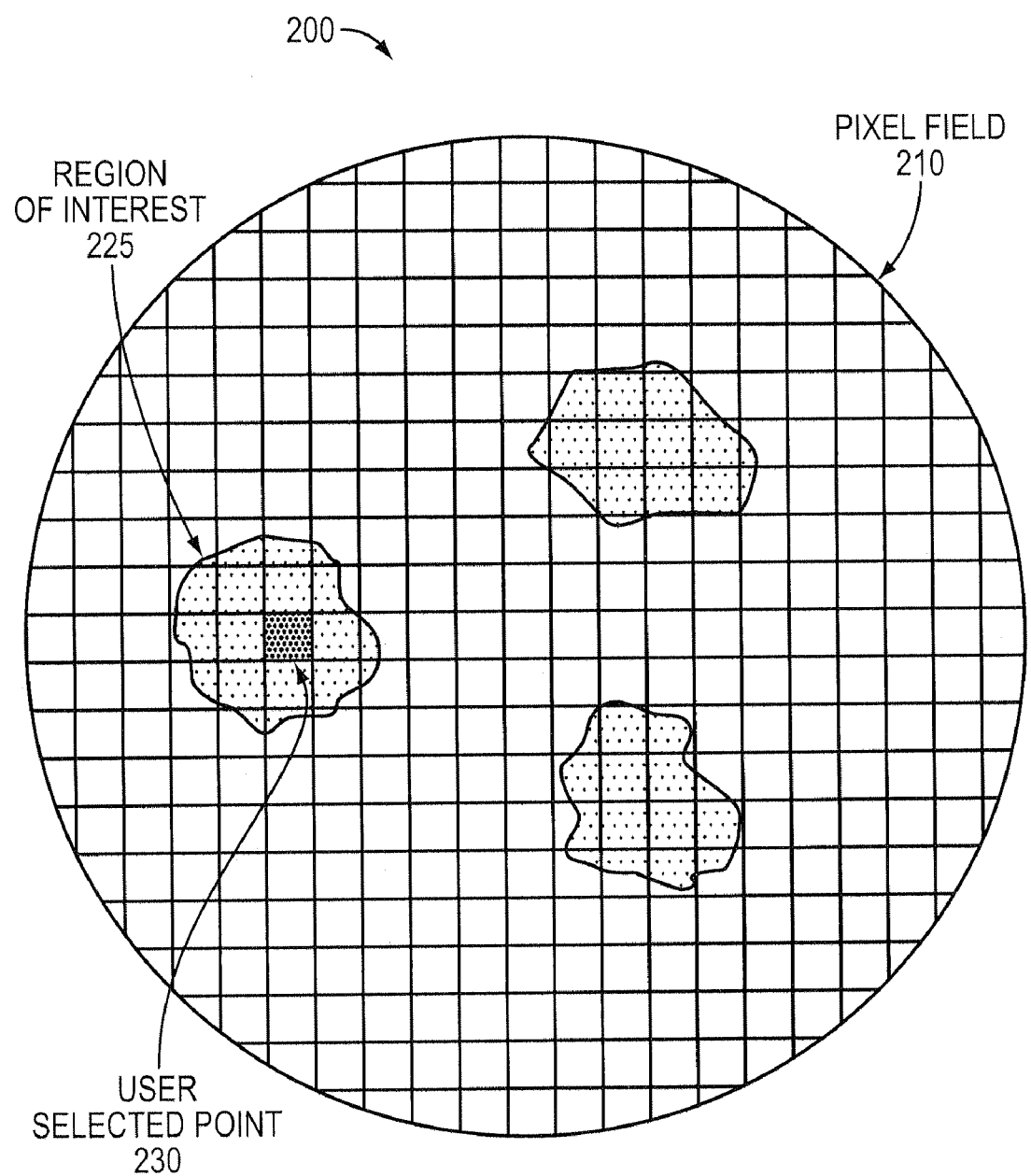
FIG. 2 illustrates an example of a user-selected point within a region of interest in a pixel field according to an example embodiment of the present invention.

FIG. 2 illustrates an example of a user-selected point 230 within a region of interest 225 in a pixel field 210 according to an example embodiment 200 of the present invention. The pixel field 210 may include a small portion of pixels from a larger pixel field or image, such as a medical image (i.e, radiological), semiconductor or steel screening images, or environmental monitoring images (e.g., remote sensing image). The pixel field 210 may include a plurality of regions of interest 225 (e.g., anomalous regions or tumors in medical images). Regardless of the nature of these images, one possible goal of processing is to extract, from the images, features that describe the structure of the region of interest.

Figure 3:
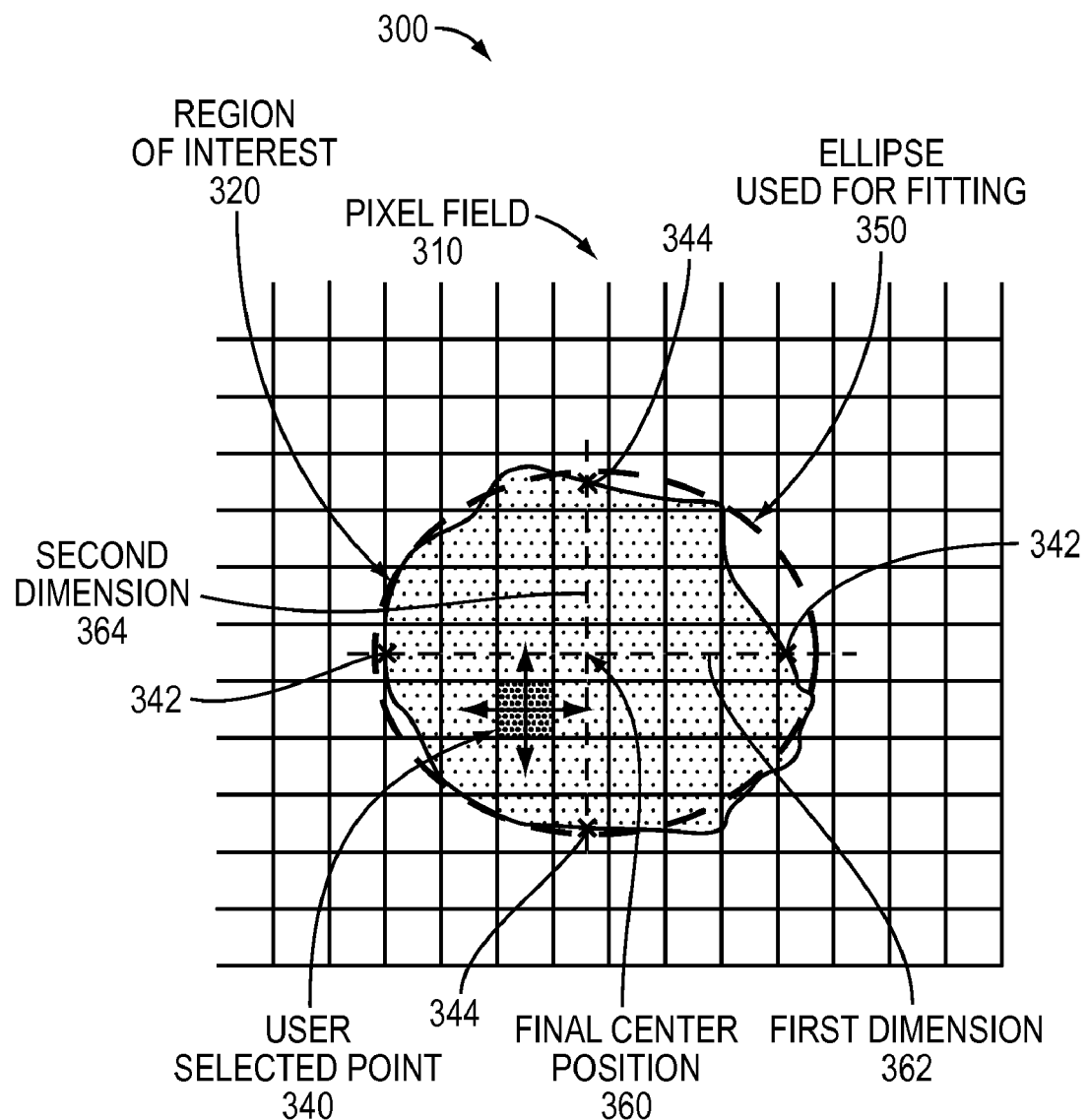
FIG. 3 illustrates an example embodiment of the present invention for providing measurement data of a region of interest.
Figure 4:
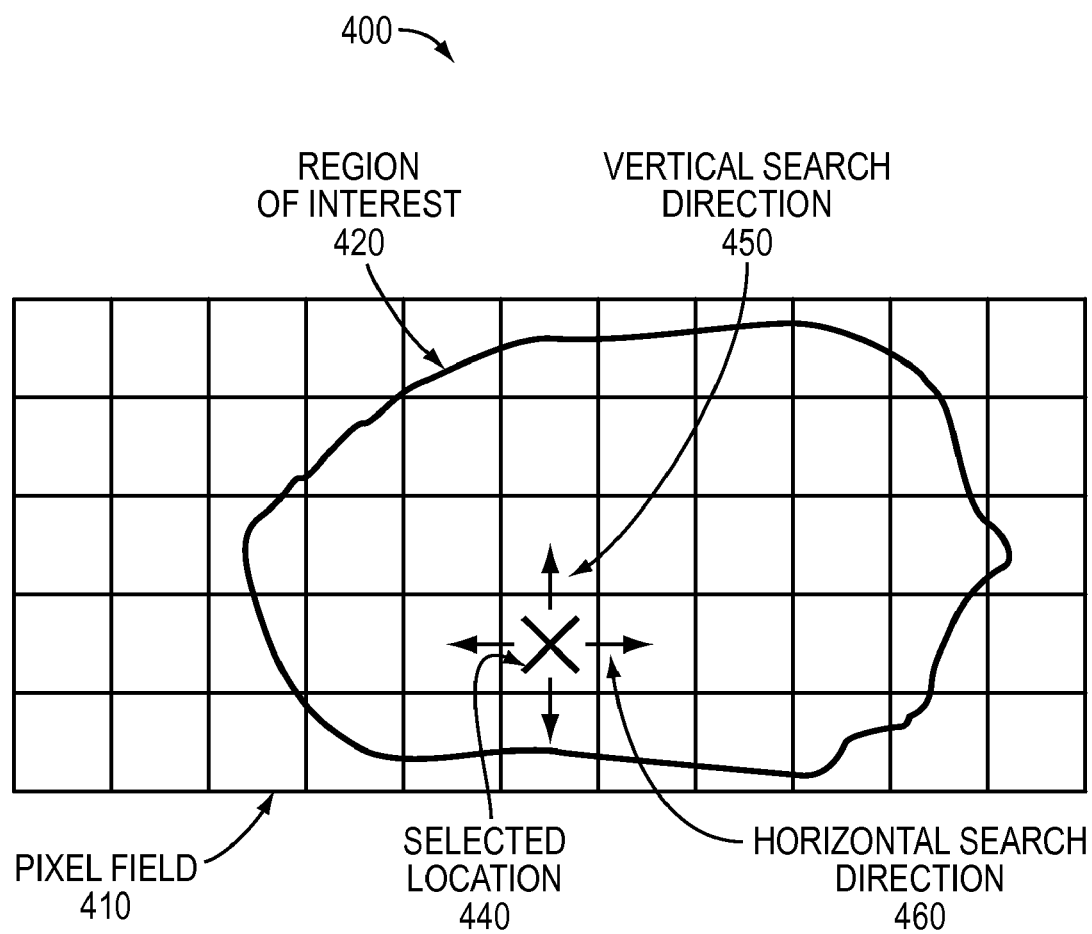
FIG. 4 illustrates procedures that may be used by an example embodiment of the present invention to locate pairs of edge points of a region of interest.
Figure 5:
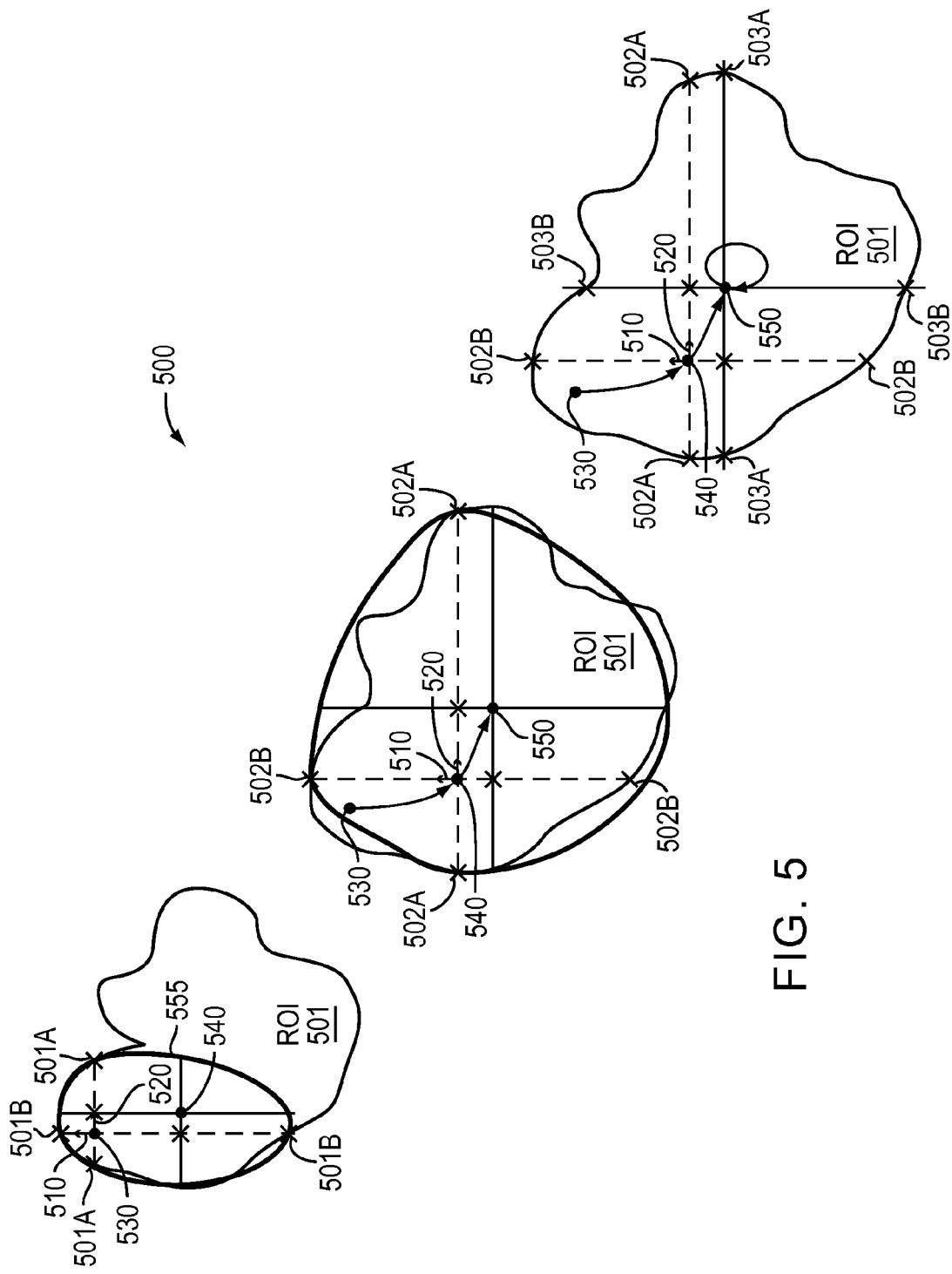
FIG. 5 is a detailed description of the procedures that may be used by an example embodiment of the present invention to locate a center position and pairs of edge points of a region of interest.

In order to obtain the features from a region of interest, a screener (not shown), such as a radiologist, selects a point 230 within the region of interest 225. The example embodiment 200 employs the selected point 230 as an initialization point. The example embodiment 200 employs the selected point 230 and iterates until a state of convergence or divergence is reached. FIGS. 3-5 graphically illustrate an embodiment that reaches a state of convergence.

FIG. 3 illustrates an example embodiment 300 of the present invention for providing measurement data of a region of interest 320. The region of interest 320 may include a plurality of pixels (in two dimensions (2D)) or voxels (in three dimensions (3D)). In a 2D imaging case, the pixels forming the region of interest 320 pixels may be a subset of a pixel field 310 such as a radiological image.

The example embodiment 300 provides the measurement data of the region of interest 320 by using an initial user-selected (or computer-selected) point 340 to locate a pair of edge points 342 and a pair of edge points 344 in first and second dimensions 362, 364 (e.g., X and Y) of the region of interest 320. The first and second dimensions 362, 364 may be orthogonal dimensions. In one embodiment, the edge points in the pairs of edges 342 and 344 are found through linear searches, described in detail below in reference to FIGS. 3 and 4. A center position is calculated based on the located pairs of edge points 342 and 344, and the process repeats to use the calculated center position to find a next position from which to identify next pairs of edge points. The example embodiment continues to make iterations and locates updated pairs of edge points and updated center locations.

In order to locate the updated center location 360, the example embodiment 300 may calculate a center position between the respective edge points in the first dimension 362 and a center position between the respective edge points in the second dimension 364. Alternatively, the example embodiment 300 may find the updated center position 360 based on discovering a structure, such as an ellipse 350 or a circle, that best fits the region contained between the located edge points in the first 362 and second 364 dimensions. The example embodiment 300 may determine the dimension of the ellipse 350 based on calculating the largest area surrounded by the located edge points in the first 362 and second 364 dimensions and designing an ellipse 350 whose horizontal and vertical axes are along the first 362 and second 364 dimensions. The example embodiment 300 determines the updated center location as a function of the center (i.e., intersection point of the axes) of the ellipse. The example embodiment 300 continues to search for the first and second pairs of edge points and updates the center location until convergence or divergence is determined The example embodiment 300 computes the measurement data based on a final center position 360 relative to edge points associated with the final center position 360 in the event convergence is determined. In the event divergence is detected, the example embodiment reports a failure state.

FIG. 4 illustrates procedures that may be used by an example embodiment 400 of the present invention to locate pairs of edge points in first 450 and second 460 dimensions of the region of interest 420 selected by a user in a pixel field 410 presented in a GUI.

Edge detection algorithms have been introduced and used in the art. These algorithms generally assume that a sharp change in the intensity of the pixels (or voxels in 3D) of an image most likely represents image features, such as discontinuities in depth and surface orientations and changes in material properties. In the case of medical images, a sharp change in the value of the pixels may represent discontinuities in shape or material properties.

In order to locate the pairs of edge points, the example embodiment 400 may employ the discontinuities and deviations in the intensity of the pixels. The example embodiment 400 may locate the pairs of edge points based on transitioning outward from the center position 440 and determining the deviations in the neighboring pixel intensities. If a sharp change in the intensity of the pixels is detected (i.e., deviation in pixel intensities is larger than a predetermined intensity), the example embodiment 400 employs the position of the pixel responsible for the sharp discontinuity to determine an edge point in the first dimension 450. Similarly, the example embodiment 400 may employ the discontinuities in the pixel intensities to determine an edge point in the second dimension 460.

The example embodiment 400 compensates for noise during the locating of the pairs of edge points (not shown). The example embodiment 400 employs methods known in the art such as averaging the intensities of multiple pixels at each pixel position along each dimension or smoothing the intensities of multiple pixels at each pixel position along each dimension to compensate for noise. The example embodiment locates the pairs of edge points based on identifying discontinuities and deviations in the value of the pixels corrected for noise.

The example embodiment 400 may locate the pairs of edge points based on the pixel values obtained from the gray scale of the image presented in the GUI. The example embodiment 400 may locate the pairs of edge points based on other image information (i.e., other than pixel values), such as information stored in a Digital Imaging and Communications in Medicine (DICOM) image.

FIG. 5 is a detailed illustration of the procedures that may be used by an example embodiment 500 of the present invention to locate a center position 540 and the pairs of edge points 503A and 503B of a region of interest 501. The example embodiment 500 provides measurement data of the region of interest 501 in an image in a GUI environment by locating the pairs of edge points 503A and 503B in first 510 and second 520 dimensions of the region of interest 501 selected by a user in a pixel field presented in a GUI (not shown). The user may select the region of interest 501 by selecting an initial center position 530 within the region of interest. Various methods in the art may be used to select the initial center position including, but not limited to, click of a mouse, pressing a key on a keyboard, and so forth. The initial center point 530 selected by the user (or computer) may be located anywhere within the region of interest 501. In one example embodiment, an image screener, such as a radiologist, may select a point within a region of interest 501 such as an area suspected to be an anomaly (e.g., tumor, aneurism, etc.).

The example embodiment 500 starts by transitioning outwards in the first 510 and second 520 dimensions from the initial center position 530, where transitioning outward may be a linear walk on a pixel-by-pixel basis, skipping multiple pixels and determining whether an edge point has been reached at each pixel tested. Additionally, the example embodiment 500 may perform only a single dimension linear walk for a 2-dimensional image.

Some existing image processing techniques are linear in the number of pixels processed (i.e., also referred to as O(n), where O(•) is a complexity function and n denotes the total number of pixels in the image) and hence require that every pixel in the image be processed. In contrast, the example embodiment 500 need not process every pixel. Specifically, the example embodiment can produce useful results by processing $O(a \log_b(n))$ pixels, where a is a constant and b denotes the number of dimensions of the image.

Alternatively, the method may select a pixel far away from the initial selected pixel 530 to be in an area expected to be outside the region of interest 501 and iteratively having or otherwise selecting an in-between point until an edge between the initial and "far away" points are found. In this latter case, if the in-between position has a gray-scale color closer to the initial positions gray-scale color, then a next position is selected between the in-between position and the "far away" position, and vice-versa. Using either technique, the example embodiment may employ methods known in the art, such as pixel intensity deviation, edge detection, image gradient intensity determination, etc., to locate the pairs of edge points 501A and 501 B in the first 510 and second 520 dimensions.

The example embodiment 500 may use a gray-scale of the GUI instead of the gray-scale of the pixel intensities in the image to locate the pairs of edge points.

When using a method such as pixel intensity deviation, the example embodiment 500 may determine the pairs of edge points 501A and 501B by calculating the differences between the intensities of the pixels in the first 510 and second 520 dimensions and determining an edge point (i.e., an edge pixel or an edge voxel) in the region of interest where a sharp change in the pixel intensities is detected.

After determining the edge points in the first 510 and second 520 dimensions, the example embodiment determines an ellipse 555 whose dimensions best fit the area contained by the pairs of edge points 501A and 501B. In order to discover the ellipse used for fitting, the example embodiment may find an ellipse whose boundary contains both discovered pairs of edge points 501A and 501B. The example embodiment 500 finds an updated center location based on finding the intersection point of the major and the minor axes of the ellipse 555. The example embodiment continues to iterate and look for updated center locations until convergence or divergence is determined.

The example embodiment 500 may determine convergence based on computing a difference (i.e., a residual value) between the center position measurements obtained in consecutive iterations. The residual value is compared against a threshold or a threshold range. If the residual value is within the threshold range (or is smaller than the threshold value), the example embodiment 500 either continues to calculate new center positions or declares convergence. Convergence may be declared based on comparing the residual value to a predetermined limit and declaring convergence if the residual value is negligible. If the residual value falls outside of the threshold range (or is larger than the threshold value), the example embodiment 500 declares divergence after some pre-set number of iterations.

Figure 6:
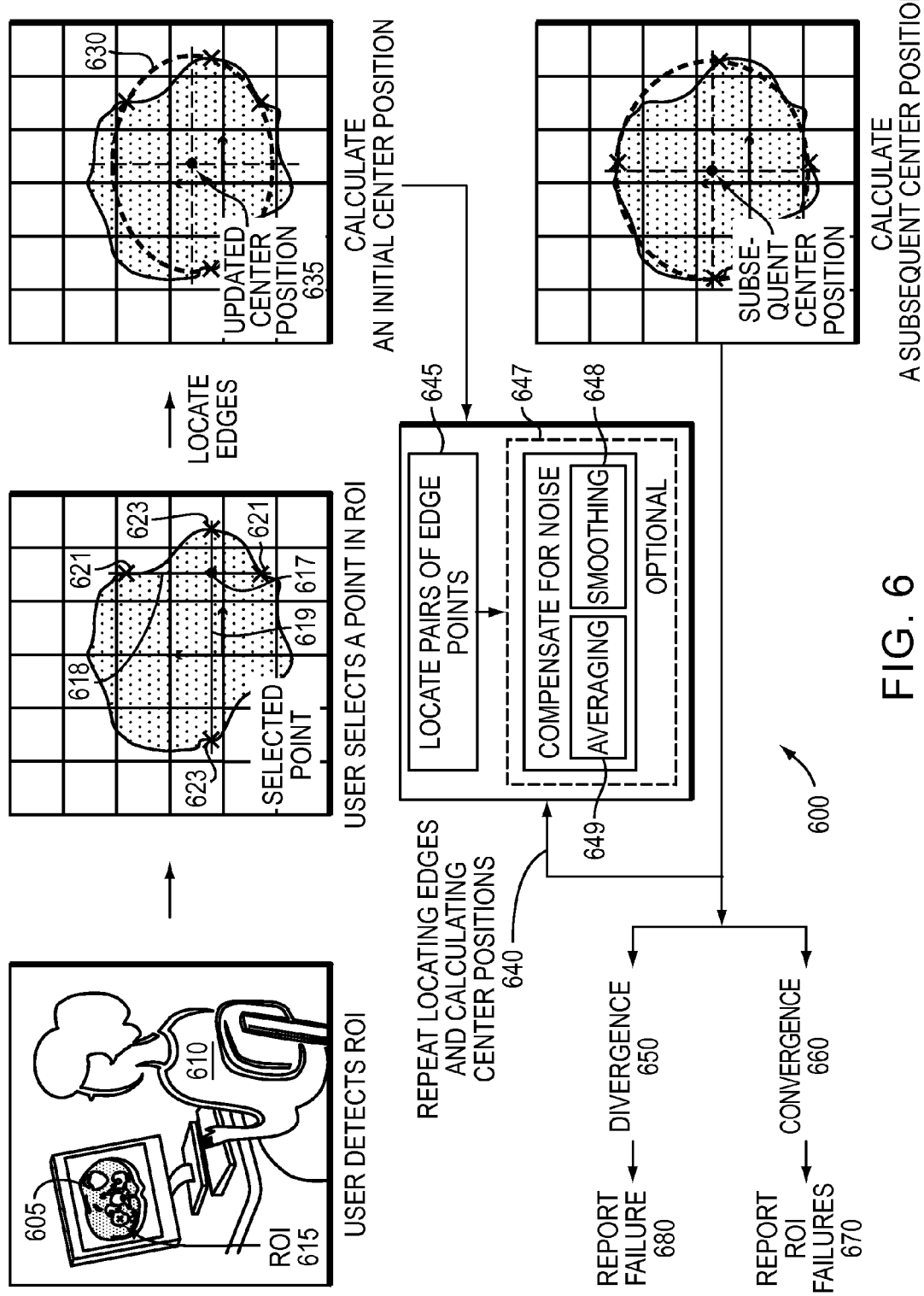
FIG. 6 is an illustration of an example embodiment of the present invention for providing measurement data of a region of interest of an image.

FIG. 6 is an illustration of an example embodiment 600 of the present invention for providing measurement data of a region of interest 615 of an image. In this example embodiment 600 a user, such as an image screener 610 or a radiologist, selects a region of interest within an image 605. The user 610 may select the region of interest 615 by selecting a point 619 within the image, such that the selected point is a subset of the region of interest 615. The example embodiment 600 employs the point 619 selected by the user 610 to obtain the pairs of edge points 621 and 623 in first 618 and second 619 dimensions in a manner presented above and presented in detail immediately below.

In one example embodiment, in order to find the pairs of edge points 621 and 623, a transition (also referred to as "walk") from a selected pixel in the first 618 and second 619 dimensions is made. Specifically, the example embodiment 600 starts from the selected pixel denoted by 617, walks to the next pixel in the first dimension (e.g., the next pixel being the selected pixel's 617 immediate neighbor in the first dimension 618), and determines the pixel intensity deviation between the two pixels. Factors other than pixel intensity (e.g., texture) may also be used. The example embodiment 600 continues to walk in the first dimension and determine pixel intensity deviations. If a sharp change in value of deviation is determined, the example embodiment employs the point responsible for the sharp deviation to determine edge point 621 in the first dimension 618. A similar approach is taken to determine a pair of edge points 623 in the second dimension 619. Based on the discovered pairs of edge points 621 and 623, the example embodiment determines an ellipse 630 whose dimension best fits the region contained by the pairs of edge points 621 and 623. An updated center location 635 is discovered based on the center of the ellipse 630 used for fitting.

The example embodiment 600 continues to search 640 for updated pairs of edge points at 645 in the first 618 and second 619 dimensions and updates the location of the center position. The example embodiment 600 compensates for noise 647 during the locating of the pairs of edge points. The example embodiment 600 employs methods known in the art such as averaging the intensities of multiple pixels at each pixel position along each dimension 649 or smoothing the intensities of multiple pixels at each pixel position along each dimension 648 to compensate for noise. The example embodiment 600 locates the pairs of edge points based on identifying a pixel value deviation corrected for noise.

At each iteration, the example embodiment determines if convergence 660 or divergence 650 has been reached. As stated above, a state of convergence 660 is defined to be the state in which the determined features of the region of interest 615 remain within a certain limit. In order to determine convergence 660, the example embodiment 600 may determine the differences between the measurement data (such as location of the pairs of edge points) obtained from any given iteration to the measurement data obtained from that iteration's previous or consecutive iteration. If the determined differences between the measurement data from consecutive iterations is within a predetermined range or less than a predetermined threshold, the example embodiment 600 may continue to iterate or declare convergence. If the change between the measurement data from consecutive iterations is outside of the predetermined limit, the example embodiment 600 declares divergence 650.

In order to decide between declaring convergence 660 and continuing iterations 640, the example embodiment 600 may compare the differences between measurement data from consecutive iterations. If the difference between measurement data from consecutive iterations is within the predetermined threshold for convergence and small and negligible (the negligibility factor is determined based on comparing to a pre-set value), the example embodiment declares convergence 660. If the difference between measurement data from consecutive iterations is within the predetermined threshold for convergence but larger than the pre-set value for determining negligibility, the example embodiment 600 continues to search 640 for updated pairs of edge points in the first 618 and second 619 dimensions and update the location of the center position.

If convergence 660 is detected, the example embodiment 600 reports measurement data including features of the region of interest 670. In order to compute the measurement data, the example embodiment 600 may compute measurements such as: a size of the region of interest 615, a density of the region of interest 615 optionally by computing the density of the region of interest as a function of using a gray-scale of the GUI (not shown), convex hull (not shown), centroid (not shown), diameter (not shown), area (not shown), a texture of the region of interest 615, a position of the region of interest within the pixel field 615, a distance of the region of interest 615 from the initial center position 617, or a distance of the region of interest 615 from a second region of interest (not shown).

The example embodiment 600 may report the measurement data using methods available in the art such as: superimposing the measurement data on the pixel field, transmitting the measurement data via a data network, or storing the measurement data to a storage unit and optionally storing the measurement data in an electronic format.

If divergence is detected 650, the example embodiment 600 reports failure 680. In this case, the example embodiment 600 may prompt the user to select a new initial center position within the region of interest 615 or a different region of interest (not shown).

Figure 7:
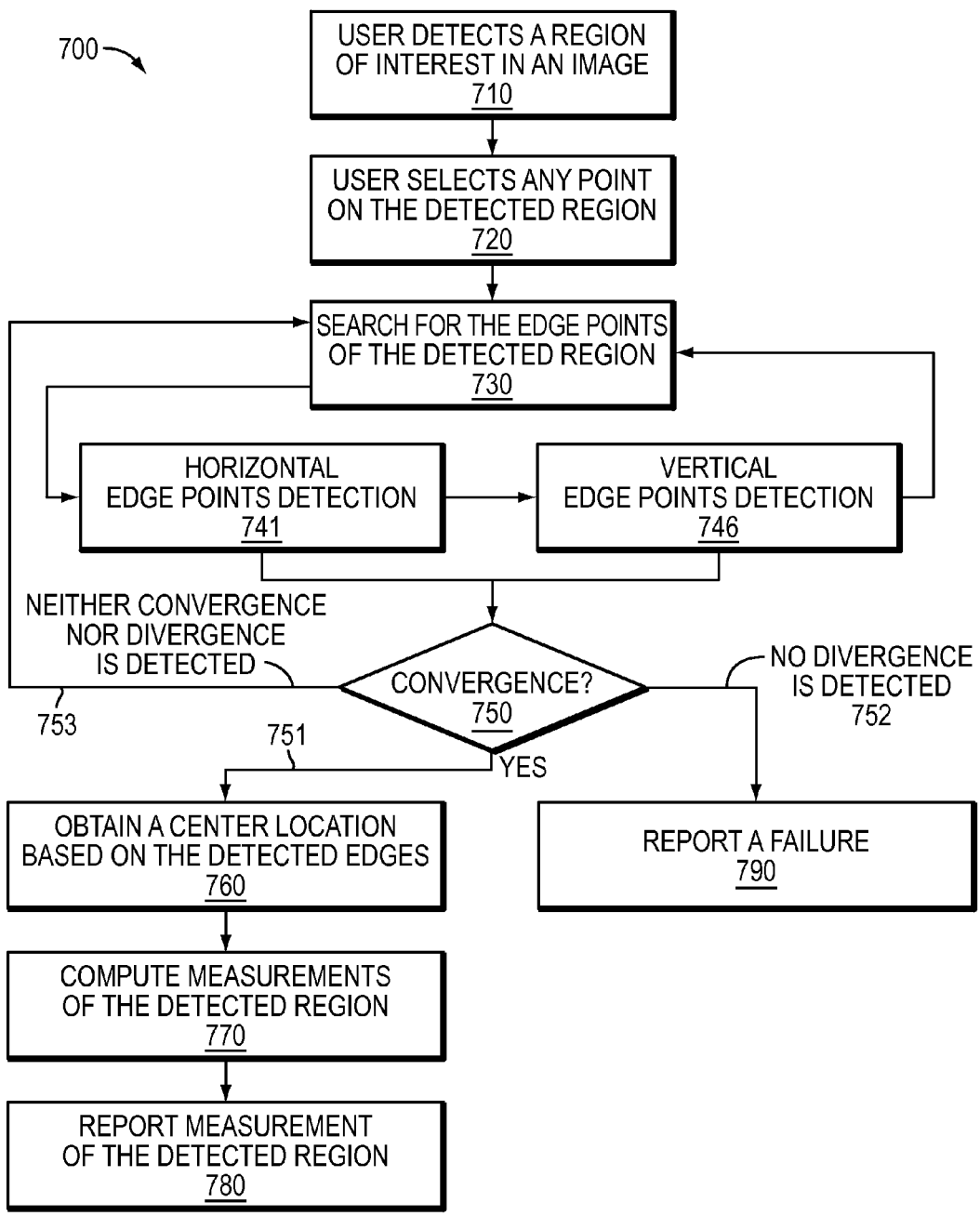
FIG. 7 is a high-level flow diagram of an example embodiment of the present invention.

FIG. 7 is a high-level flow diagram of an example embodiment 700 of the present invention. In this example embodiment 700, a user, such as an image screener or a radiologist, detects a region of interest, such as a tumor in a medical image 710. The user then selects a point within the region of interest 720. The example embodiment 700 employs the selected point to search for pairs of edge points in the first and second directions 730. In some embodiments, the first and the second dimensions include horizontal 741 and vertical 746 dimensions. The example embodiment 700 then determines if convergence or divergence has been detected 750. If divergence has been detected (i.e., convergence is not detected) 752, the example embodiment 700 reports a failure 790. If convergence is detected 751, the example embodiment obtains a final center position for the region of interest based on the detected edge points 760, determines measurement information such as size, density, etc. for the region of interest 770, and reports the measurement information 780.

If neither convergence nor divergence is detected 753 within a pre-selected or dynamically determined length of time or number of iterations, the example embodiment may continue to search for pairs of edge points in the first and second directions 720 for an extended length of time or predetermined number of iterations, optionally with a mid-search notice of the extension being reported. The example embodiment 700 reports divergence if convergence is not met within the length of time or number of iterations.

Given that the example embodiment 700 is arranged to iterate through a limited number of iterations and report convergence or divergence, the possibility of a false positive measurement report is significantly reduced. After each number of iterations, the example embodiment determines if convergence 751 or divergence 752 has been obtained.

Figure 8:
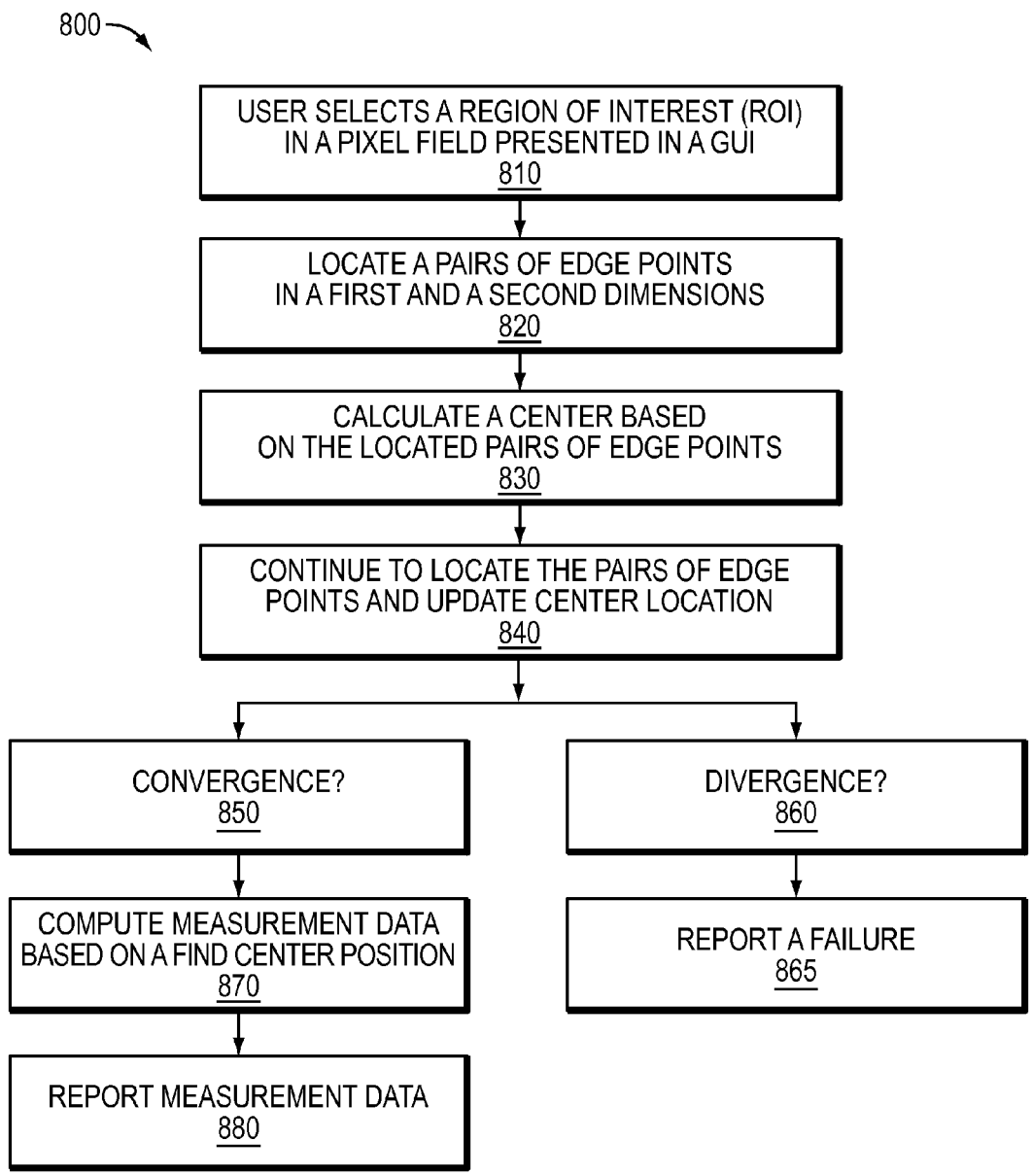
FIG. 8 is a high-level flow diagram of an example embodiment of the present invention for providing measurement data.

FIG. 8 is a high-level flow diagram of an example embodiment 800 of the present invention for providing measurement data. The example embodiment 800 provides measurement data of a region of interest in an image in a GUI environment by locating pairs of edge points in first and second dimensions 820 of the region of interest selected by a user 810 in a pixel field presented in the GUI. The example embodiment 800 calculates a center position based on located edge points in the first and second dimensions 830 and continues to locate updated pairs of edge points as well as calculate updated center locations 840 until a convergence 850 or divergence 860 is determined. The example embodiment 800 computes measurement data based on a final center position relative to edge points associated with the final center position in an event convergence is determined 870 and reports the measurement data 880 in the event convergence is detected or reports a failure state in an event divergence is detected 865.

Figure 9:
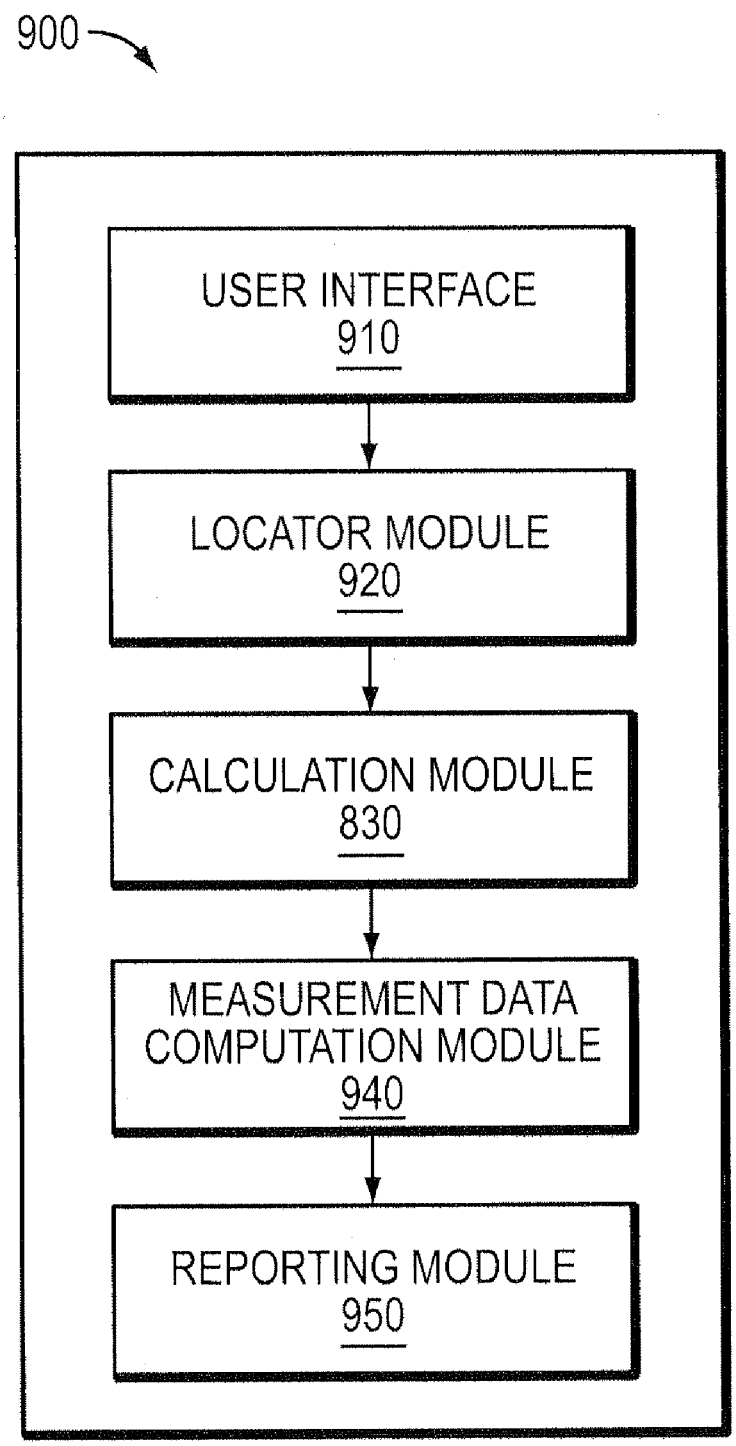
FIG. 9 is a flow diagram of an example embodiment of the present invention for providing measurement data.

FIG. 9 is a flow diagram of an example embodiment 900 of the present invention for providing measurement data of a region of interest in an image in a GUI environment 910. In this example embodiment 900, a locator module 920 locates pairs of edge points in first and second dimensions of the region of interest selected by a user in a pixel field presented in a GUI. A calculation module 930 calculates an initial center position based on located edge points in the first and second dimensions. The locator 910 and calculation 930 modules continue to locate and calculate until convergence or divergence is determined. A measurement data computation module 940 computes the measurement data based on a final center position relative to edge points associated with the final center position in an event convergence is determined. A reporting module 950 reports the measurement data in the event convergence is detected or reports a failure state in the event divergence is detected.

Figure 10:
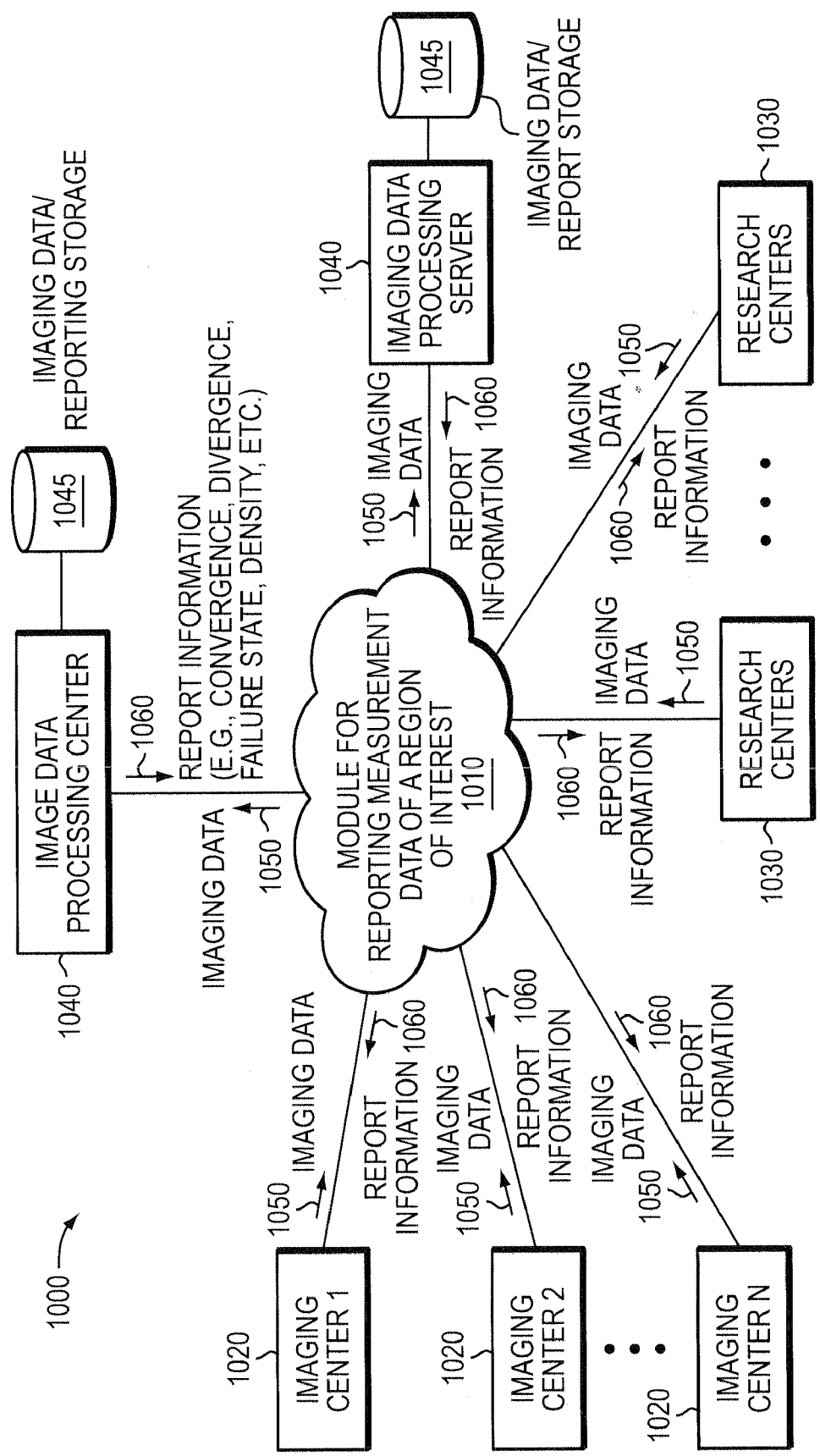
FIG. 10 is an example embodiment of the present invention for reporting measurement data.

FIG. 10 is an example embodiment 1000 of the present invention for reporting measurement data. The example embodiment 1000 may receive images or imaging data (e.g., remote sensing images, medical images, screening images) 1050 from imaging sources such as imaging centers 1020, and research centers 1030. A module for reporting measurement data of a region of interest receives the image data 1050 and forwards the image data 1050 to image data processing centers 1040 for processing. The example embodiment may receive the imaging data 1050 in forms of unprocessed or processed images. The term unprocessed herein refers to images received at imaging centers or research centers without having been processed, whereas the term processed refers to images that have been processed to detect and select a region of interest. Regardless of its nature (i.e., processed or unprocessed), the imaging data 1050 is forwarded to an imaging data processing center 1040. The imaging data processing center 1040 processes the imaging data 1050 and reports measurement data of region(s) of interest in the imaging data. The report information 1060 may include features of region (s) of interest such as convergence, divergence, failure state, density, size, location, etc. The example embodiment 1010 may report the measurement data using methods available in the art such as superimposing the measurement data on the imaging data, transmitting the measurement data via a data network, or storing the measurement data to a storage unit and optionally storing the measurement data in an electronic format. The image processing centers 1040 may store the imaging data 1050 or the reporting data 1060 in a storage device 1045 for future processing or reporting. The image processing centers 1040 transmit the measurement data to the module for reporting measurement data 1010, which in turn reports the reporting data 1060 back to the imaging 1020 and research 1030 centers.

It should be understood that procedures, such as those illustrated by flow diagram or block diagram herein or otherwise described herein, may be implemented in the form of hardware, firmware, or software. If implemented in software, the software may be implemented in any software language consistent with the teachings herein and may be stored on any computer-readable medium known or later developed in the art. The software, typically, in form of instructions, can be coded and executed by a processor in a manner understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method for providing measurement data of a region of interest in an image in a graphical user interface (GUI) environment, the method comprising:
   locating a pair of edge points, along first and second directions, based on an initial center position of the region of interest selected by a user in a pixel field presented in the GUI;
   calculating an updated center position of the region of interest based on located edge mints along the first and second directions;
   repeating locating updated edge points and calculating an updated center position, based on a previously calculated center position and previously located edge points respectively, until a convergence or divergence is determined based at least in part on differences between consecutively calculated center positions;
   computing the measurement data based on a final center position relative to edge points associated with the final center position in an event convergence is determined; and
   reporting the measurement data in the event convergence is detected or reporting a failure state in an event divergence is detected.

2. The method of claim 1 further including compensating for noise during the locating of the pairs of edge points as a function of at least one of: averaging multiple pixels at each pixel position along each direction during the locating of the pairs of edge points or smoothing multiple pixels at each pixel position along each direction during the locating of the pairs of edge points.

3. The method of claim 1 further including locating the pairs of edge points as a function of at least one of: identifying a pixel value deviation corrected for noise, transitioning outward from the center position along a single pixel line in the first and second directions until the respective pairs of edge points are identified, using a gray-scale of the GUI and not a gray-scale of pixel values of the pixel field, or employing information stored in a Digital Imaging and Communications in Medicine (DICOM) image.

4. The method of claim 1 wherein computing the measurement data includes computing at least one of: a size of the region of interest, a density of the region of interest optionally by computing the density of the region of interest as a function of using a gray-scale of the GUI, a texture of the region of interest, a position of the region of interest within the pixel field, a distance of the region of interest from the initial center position, or a distance of the region of interest from a second region of interest.

5. The method of claim 1 wherein the pixel field presented in the GUI is a radiological image, computed tomography image, or X-ray image and the region of interest is an anomaly detected in a radiological image.

6. The method of claim 1 further including at least one of the following: locating the pairs of edge points in response to the selection of a center position in the region of interest by the user, repeating locating updated edge points and calculating updated center positions for a selectable number of times, repeating the locating of updated edge points along the first or second direction but not along both directions, or allowing divergence after repeating the locating and calculating for a predetermined number of times.

7. The method of claim 1 wherein the first and second directions are orthogonal directions.

8. The method of claim 1 wherein the region of interest is non-homogenous.

9. The method of claim 1 further including calibrating the measurement data based on a resolution of the screen.

10. The method of claim 1 wherein the reporting of the measurement data includes at least one of the following: superimposing the measurement data on the pixel field, transmitting the measurement data via a data network, or storing the measurement data to a storage unit and optionally storing the measurement data in an electronic format.

11. An apparatus for providing measurement data of a region of interest in an image in a graphical user interface environment, the apparatus comprising:
   a locator module to locate a pair of edge points along a first direction and a pair of edge points along a second direction, based on an initial center position of the region of interest selected by a user in a pixel field presented in a GUI;
   a calculation module to calculate an updated center position of the region of interest based on located edge in points along the first and second directions, the locator module and calculation module continuing to locate updated edge points and calculate updated center positions, iteratively, based on a previously calculated center position and previously located pairs of edge points, respectively, until a convergence or divergence is determined based at least in part on differences between consecutively calculated center positions;
   a measurement data computation module to compute measurement data based on a final center position relative to edge points associated with the final center position in an event convergence is determined; and
   a reporting module to report the measurement data in the event convergence is detected or reporting a failure state in an event divergence is detected.

12. The apparatus of claim 11 wherein the locator module is configured to compensate for noise during the locating of the pairs of edge points as a function of at least one of: averaging multiple pixels at each pixel position along each direction during the locating of the edge points, or smoothing multiple pixels at each pixel position along each direction during the locating of the edge points.

13. The apparatus of claim 11 wherein the locator module is configured to locate the pairs of edge points as a function of at least one of:
   identifying a pixel value deviation corrected for noise, transitioning outward from the center position along a single pixel line in the first and second directions until the respective pairs of edge points are identified, using a gray-scale of the GUI and not a gray-scale of pixel values of the pixel field, or employing information stored in a DICOM image.

14. The apparatus of claim 11 wherein the measurement data computation module is configured to compute the measurement data as a function of computing at least one of: a size of the region of interest, a density of the region of interest optionally by computing the density of the region of interest as a function of using a gray-scale of the GUI, a texture of the region of interest, a position of the region of interest within the pixel field, a distance of the region of interest from the initial center position, or a distance of the region of interest from a second region of interest.

15. The apparatus of claim 11 wherein the pixel field presented in the GUI is a radiological image, computed tomography, or X-ray image and the region of interest is an anomaly detected in a radiological image.

16. The apparatus of claim 11 wherein the locator module is arranged to locate the pairs of edge points in response to at least one of the following: the selection of a center position in the region of interest by the user, repeating locating updated edge points and calculating updated center positions for a selectable number of times, repeating locating updated edge points along the first or second direction but not both directions, or allowing divergence after repeating the locating and calculating for a predetermined number of times.

17. The apparatus of claim 11 wherein the first and second directions are orthogonal directions.

18. The apparatus of claim 11 wherein the region of interest is non-homogenous.

19. The apparatus of claim 11 further including a calibration module configured to calibrate the measurement data based on a resolution of the screen.

20. The apparatus of claim 11 wherein the reporting module is arranged to report the measurement data as a function of at least one of: superimposing the measurement data on the pixel field, transmitting the measurement data via a data network, or storing the measurement data to a storage unit and optionally storing the measurement data in an electronic format.

21. A computer program product comprising a non-transitory computer readable medium having computer readable code stored thereon, which, when executed by a processor, causes the processor to:
   locate a pair of edge points along a first direction and a pair of edge points along a second direction, based on an initial center position of the region of interest selected by a user in a pixel field presented in a GUI;
   calculate an updated center position of the region of interest based on located edge points in the first and second directions;
   continue to locate updated edge points and calculate updated center positions, iteratively, based on a previously calculated center position and previously located edge points, respectively, until a convergence or divergence is determined based at least in part on differences between consecutively calculated center positions;
   compute measurement data based on a final center position relative to edge points associated with the final center position in an event convergence is determined; and
   report the measurement data in the event convergence is detected or reporting a failure state in an event divergence is detected.

* * * * *

UNITED STATES PATENT AND TRADEMARK OFFICE
CERTIFICATE OF CORRECTION

| | | |
|---|---|---|
| PATENT NO. | : 8,290,231 B2 | Page 1 of 1 |
| APPLICATION NO. | : 12/359002 | |
| DATED | : October 16, 2012 | |
| INVENTOR(S) | : Naveen Garg | |

It is certified that error appears in the above-identified patent and that said Letters Patent is hereby corrected as shown below:

In the Claims:

In Column 12, line 15, Claim 1: delete "mints" and insert --points--;

In Column 13, line 22, Claim 11: delete "in"

Signed and Sealed this
Fifteenth Day of January, 2013

David J. Kappos
*Director of the United States Patent and Trademark Office*